(12) United States Patent
Fleder et al.

(10) Patent No.: US 11,808,623 B2
(45) Date of Patent: Nov. 7, 2023

(54) ELECTRO-OPTICAL INFRARED WINDOW FOR HYPERSONIC APPLICATIONS

(71) Applicant: Raytheon Company, Waltham, MA (US)

(72) Inventors: Charles Edward Fleder, Patagonia, AZ (US); Richard L. Gentilman, Acton, MA (US); Martin A. Woolf, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 103 days.

(21) Appl. No.: 17/466,693

(22) Filed: Sep. 3, 2021

(65) Prior Publication Data

US 2023/0070657 A1 Mar. 9, 2023

(51) Int. Cl.
*G01J 1/02* (2006.01)
*F41G 7/22* (2006.01)

(52) U.S. Cl.
CPC .......... *G01J 1/0252* (2013.01); *F41G 7/2253* (2013.01)

(58) Field of Classification Search
CPC .... G01J 1/0252; F41G 7/2253; C04B 35/505; C04B 35/04; C04B 36/6205
See application file for complete search history.

(56) References Cited

U.S. PATENT DOCUMENTS

| | | | |
|---|---|---|---|
| 3,267,857 A | 8/1966 | Lindberg, Jr. | |
| 6,530,539 B2* | 3/2003 | Goldman | F41G 7/2253 359/845 |
| 6,943,336 B2* | 9/2005 | Mangoubi | B64C 1/1492 359/359 |
| 10,914,529 B1* | 2/2021 | Tucker | C30B 25/02 |
| 2002/0050559 A1* | 5/2002 | Mangoubi | B64C 1/38 250/216 |
| 2002/0109038 A1* | 8/2002 | Goldman | F41G 7/2293 244/3.16 |
| 2011/0315808 A1 | 12/2011 | Zelinski et al. | |
| 2019/0002328 A1* | 1/2019 | Lezzi | C03B 27/044 |

OTHER PUBLICATIONS

Stefanik et al., Nano-composite optical ceramics for infrared windows and domes, May 2007, Proc. of SPIE vol. 6545, (65450A-1-65450A-5) (Year: 2007).*
Stefanik et al., Nano-composite optical ceramics for infrared windows and domes; May 2, 2007; SPIE Digital Library, vol. 6545 65450A-1-5. (Year: 2007).*
International Search Report Issued in International Application No. PCT/US2022/037048 dated Oct. 24, 2022; 6 Pages.
Written Opinion Issued in International Application No. PCT/US2022/037048 dated Oct. 24, 2022; 8 Pages.

* cited by examiner

*Primary Examiner* — Emmanuel E Duke
(74) *Attorney, Agent, or Firm* — CANTOR COLBURN LLP

(57) ABSTRACT

A guidance system for a missile performs a method for guiding the missile. The guidance system includes a target detector and a window between a target and the target detector. The window including a first pane, a second pane and a channel between the first pane from the second pane. Radiation from the target passes through the window including the first pane, the second pane and the channel to be detected at the target detector. A gas is transported through the channel between the first pane and the second pane to control a temperature of the window.

21 Claims, 4 Drawing Sheets

ELECTRO-OPTICAL INFRARED WINDOW FOR HYPERSONIC APPLICATIONS

BACKGROUND

The present disclosure relates to a guidance system for a missile and, in particular, to a system and method for reducing the effects of aerodynamic heating at high velocities on operation of the guidance system electro-optic seeker.

A missile or other aeronautic projectile can employ a guidance system that locates a target. The guidance system includes a detector that detects light or radiation from the target and corrects a trajectory of the missile based on this detection. The guidance system generally includes a window that protects the detector from the outside environment and allows radiation to pass through to the detector. At high velocities through an atmosphere, the window experiences aerodynamic heating in which the window heats up due to frictional high-speed collisions with the molecules of the atmosphere. The heated window expands and distorts, thereby affecting the path of incoming radiation and consequently the ability of the guidance system to accurately locate the target. Generally, the distortion effect becomes more pronounced as the window thickness increases. In addition, the heated window may emit light at detection wavelengths. thereby creating undesirable background noise. The heated window may also conduct and radiate heat into the missile and guidance system, which may adversely affect their performance and function. Accordingly, there is a desire to be reduce the effects of aerodynamic heating on a window of a guidance system of a missile travelling at high velocities in order to reduce optical distortion and improve guidance accuracy.

SUMMARY

According to one embodiment of the present disclosure, a method for guiding a missile is disclosed. Radiation from a target is detected at a target detector of a guidance system of the missile, wherein the radiation passes through a window between the target and the target detector, the window including a first pane, a second pane and a channel between the first pane from the second pane. A gas is transported through the channel between the first pane and the second pane to control a temperature of the window.

According to another embodiment of the present disclosure, a guidance system for a missile is disclosed. The guidance system includes a target detector, a window including a first pane and a second pane separated from the first pane by a channel, wherein radiation from a target passes through the window to be received at the target detector, and a gas flowing in the channel between the first pane and the second pane.

According to yet another embodiment of the present disclosure, a missile is disclosed. The missile includes a target detector, a window including a first pane and a second pane separated from the first pane by a channel, wherein radiation from a target passes through the window to be received at the target detector, and a gas flowing in the channel between the first pane and the second pane.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
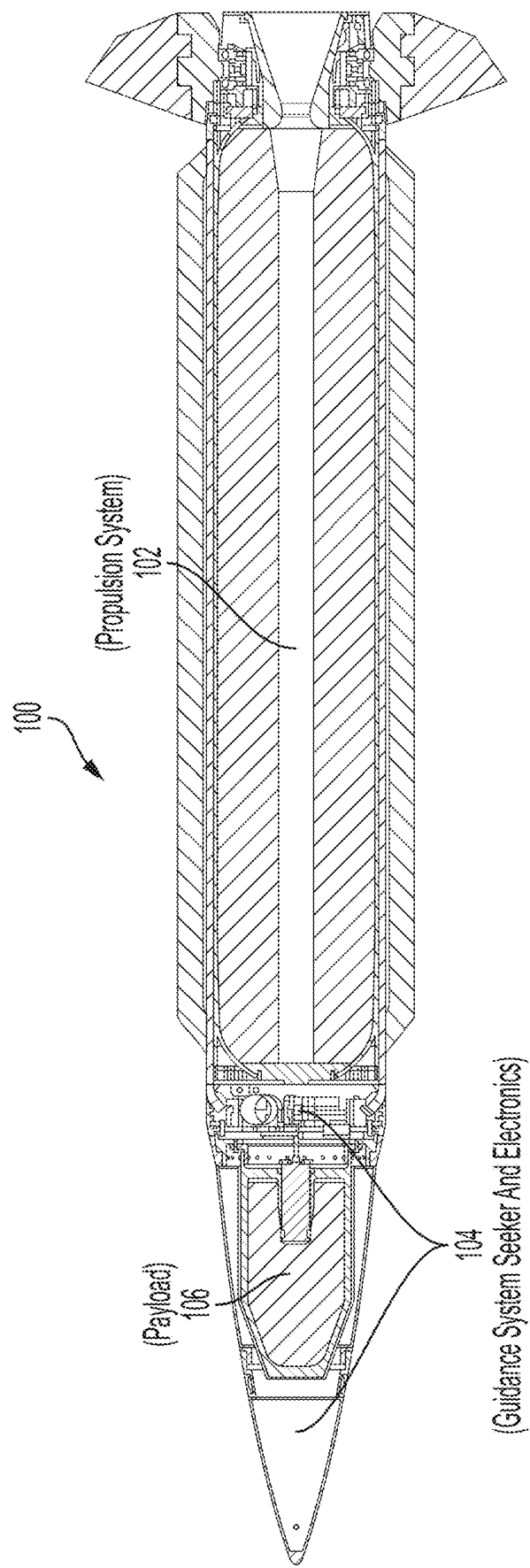
FIG. 1 shows a schematic diagram of a missile in an illustrative embodiment.

FIG. 1 shows a schematic diagram of a guided missile 100 in an illustrative embodiment. The guided missile 100 includes a flight control system 102, a guidance system 104 and a payload 106. The guidance system 104 locates a target while the guided missile 100 is in flight and generates instructions to guide the guided missile 100 toward the target. The flight control system 102 can include a thrust mechanism (e.g., a gas propulsion system) and steering devices to alter the direction of the guided missile 100 based on the instructions generated by the guidance system 104. In various embodiments, the guided missile 100 passes through an atmosphere and collides with molecules of the atmosphere during its flight. This atmospheric collision causes aerodynamic heating that heats up various sections of the missile, includes elements of the guidance system 104.

Figure 2:
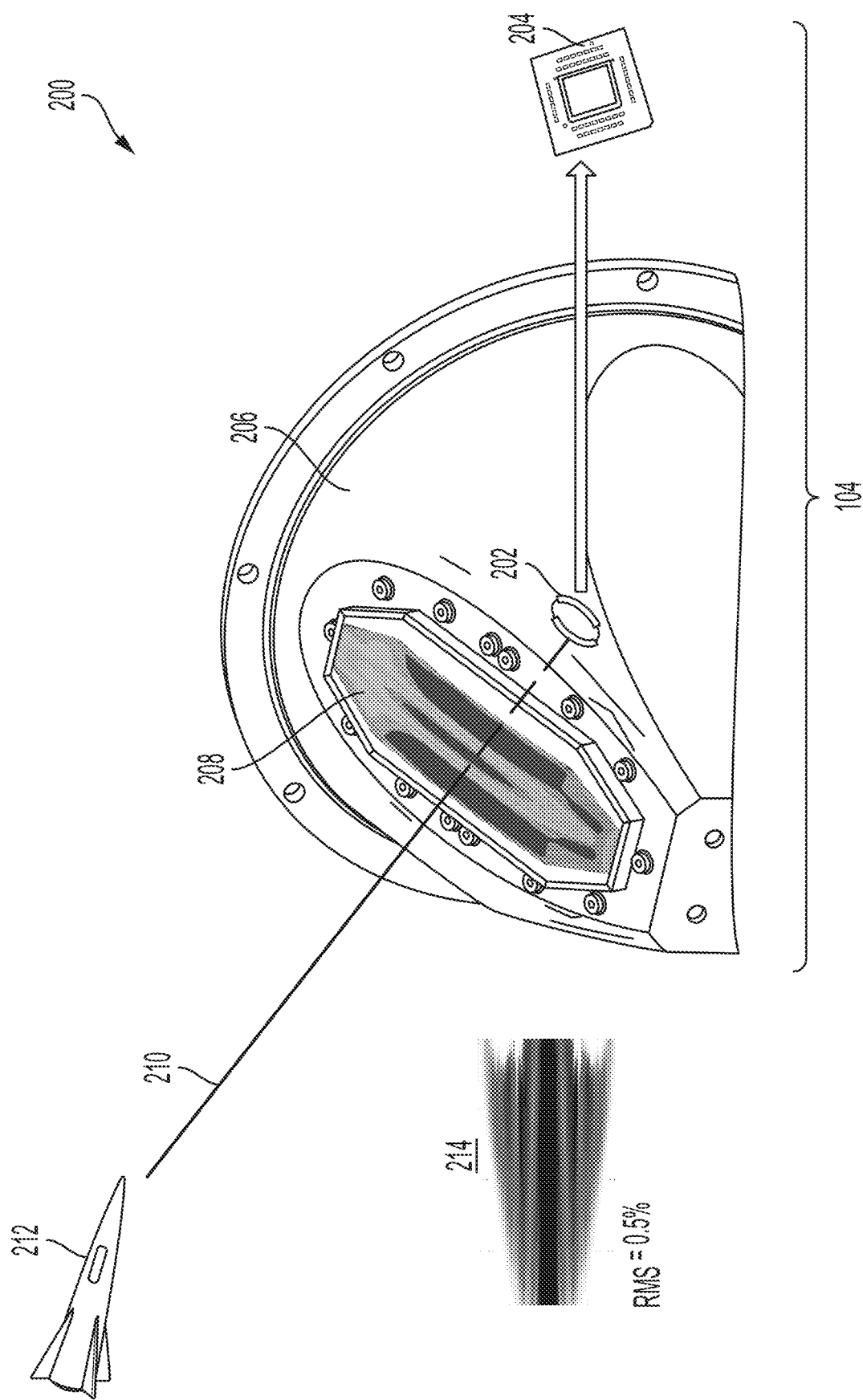
FIG. 2 shows a front end of the missile of FIG. 1, in an illustrative embodiment.

FIG. 2 shows a front end 200 of the guided missile 100, in an illustrative embodiment. The guidance system 104 can be included in the front end 200 or near the front end 200. The guidance system 104 includes a target detector 202 and a processor 204 enclosed within a housing 206 of the guided missile 100. A window 208 in the housing 206 allows radiation 210 from an outside environment 214 to pass into the housing 206 so that it can be measured at the target detector 202. The radiation 210 can be received from a target 212 and thus can be used to guide the guided missile 100 toward the target 212. The target detector 202 detects the radiation 210 and sends a signal to the processor 204 which determines a direction of the target 212 from the signal. The processor 204 then communicates a guidance command to the flight control system 102. The flight control system 102 can adjust or maintain a course of the guided missile 100 based on the guidance signal.

The housing 206 and window 208 isolate the target detector 202 from the outside environment 214. In various embodiments, the target detector 202 is an infrared detector and the window 208 is transparent or transmissive at one or more infrared wavelengths.

Figure 3:
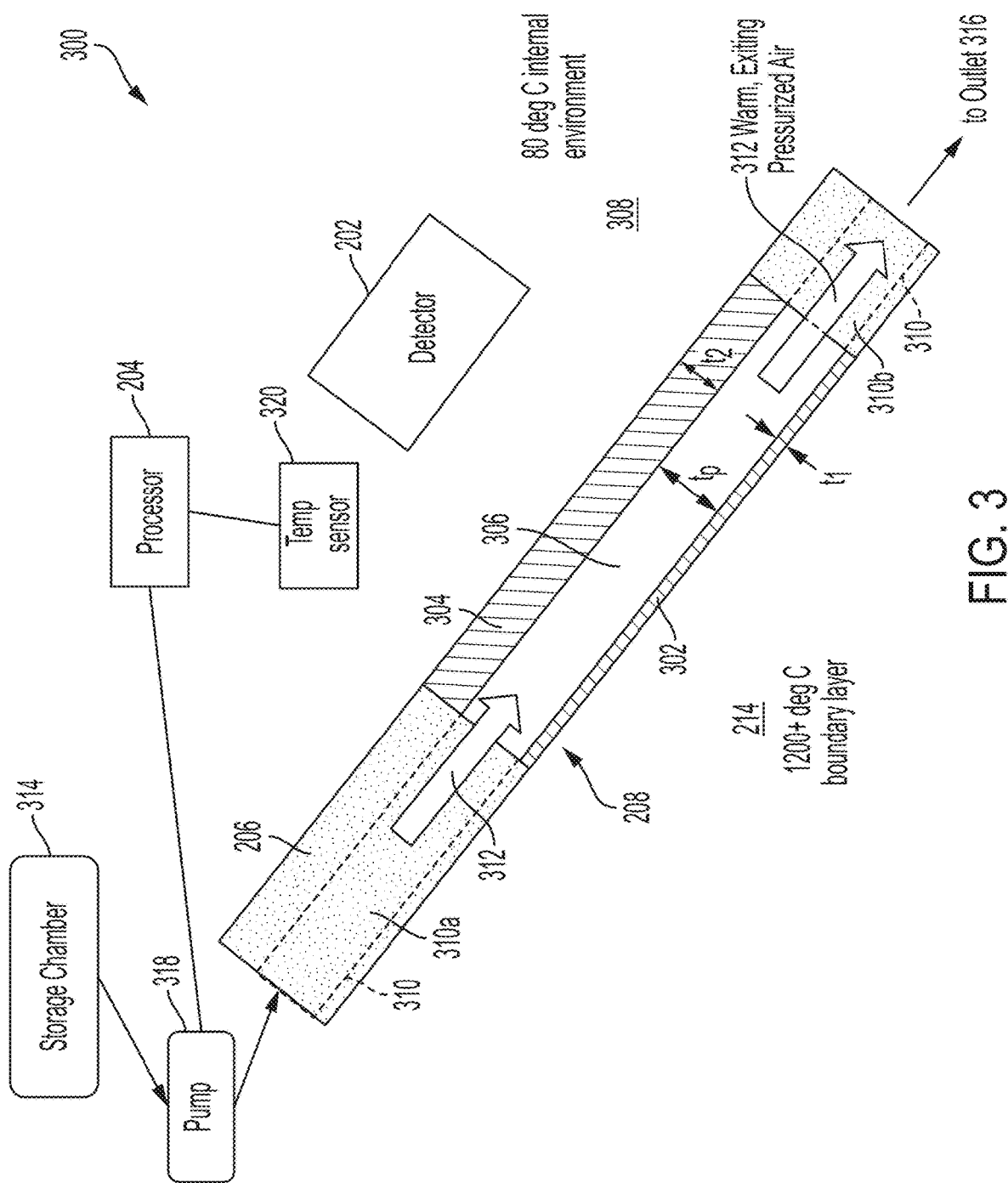
FIG. 3 depicts a section of a guidance system of the missile, in an illustrative embodiment.

FIG. 3 depicts a section 300 of the guidance system 104 including the housing 206 and window 208, in an illustrative embodiment. The window 208 includes a first pane 302 and a second pane 304. The first pane 302 is an outer pane in contact with the outside environment 214. The second pane 304 is an inner pane in contact with an interior 308 of the guided missile 100. The first pane 302 and the second pane 304 are parallel or substantially parallel to each other and are separated by a gap or channel 306.

The first pane 302 has an outer window thickness $t_1$ and the second pane has an inner window thickness $t_2$. In various embodiments, the inner window thickness $t_2$ can be greater than the outer window thickness $t_1$, although this is not a limitation on the window. In an embodiment, the outer window thickness $t_1$ is about 0.2 inches (about 0.51 cm) and the inner window thickness $t_2$ is about 0.4 inches (about 1.01 cm). A width $t_p$ of the channel 306 (i.e., a distance between the first pane 302 and the second pane 304) is about ¼ inch (about 0.64 cm).

The first (outer) pane 302 is heated due to aerodynamic heating, while the second (inner) pane 304 establishes the channel 306 with the first pane 302. The second pane 304 also provides an indirect structural support to the first pane 302 via pressurized gas in the channel 306. The first pane 302 serves as a heat shield that isolates the second pane 304 from the occurrence of aerodynamic heating. When the guided missile 100 is travelling at hypersonic speeds (e.g., greater than about Mach 5), the first pane 302 can heat up to greater than 1000° Celsius, if no cooling is applied, and typically to a temperature greater than 1200° Celsius. The second pane 304 also provides a layer of thermal isolation between the outside environment 214 and the interior 308 and/or target detector 202.

A housing passage 310 within the walls of the housing 206 provide a conduit for directing a gas 312 through the channel 306. The housing passage 310 includes a first section 310a that connects a pressurized tank 314 to the channel 306 and a second section 310b that connects the channel 306 to a port or outlet 316. The pressurized tank 314 stores the gas 312 in a pressurized or liquefied state. A regulator 318 transports and regulates the gas 312 from the pressurized tank 314 through the first section 310a, channel 306 and second section 310b. The gas 312 enters the channel 306 from the first section 310a at a side of the channel 306 and travels or flows parallel to the surfaces of the first pane 302 and the second pane 304, exiting the channel 306 at the side of the channel 306 and into the second section 310b. In the channel 306, the gas 312 absorbs heat from the first pane 302, thereby reducing a temperature of the first pane 302 from its 'uncooled' temperature. The gas 312 then flows through the second section 310b to transfer heat out of channel 306.

In various embodiments, the gas 312 is a pressurized gas, which can be nitrogen or dry air. The gas 312 moderates the temperature of both the first pane 302 and the second pane 304 to maintain the temperature of the second pane 304 at a cool temperature (e.g., within a range of about 50° C. to about 80° C.). The first pane 302 is purposefully designed to be as thin as practical to minimize or reduce optical distortion due to a high thermal gradient across its body, whereas the layer of gas 312 within the channel 306 provides an indirect structural support. The regulator 318 maintains the pressure of the gas 312 such as to maintain the first pane 302 within its structural limits based on outside environmental conditions. Maintaining the second pane 304 at the cool temperature prevents the second pane 304 from experiencing the effects of heating, such as expansion, distortion, etc. The second pane 304, owing to it having a greater thickness than the first pane 302, provides structural support for the overall window assembly. As a result, radiation 210 passes through the second pane 304 with a minimum amount of heat-induced optical distortion, allowing an accurate reading of the location of the target 212.

A temperature sensor 320 can be integrated within the interior 308 to measure a temperature at the interior 308 and/or at an inside edge of the first pane 302. In various embodiments, the temperature sensor 320 can measure a temperature of the second pane 304. The temperature can be provided to a processor (such as processor 204). The processor 204 can use the temperature to control or adjust operation of the regulator 318 and thus the flow rate and pressure of the gas in the channel 306, thereby controlling a temperature of the second pane 304. For example, if the temperature exceeds a selected threshold, the processor 204 can adjust the regulator 318 to increase a flow rate of the gas 312 through the channel 306 as well as a gas pressure in the channel 306. In various embodiment, the gas pressure in the channel 306 is in a range from about 0.5 atmospheres to about 3 atmospheres.

Figure 4:
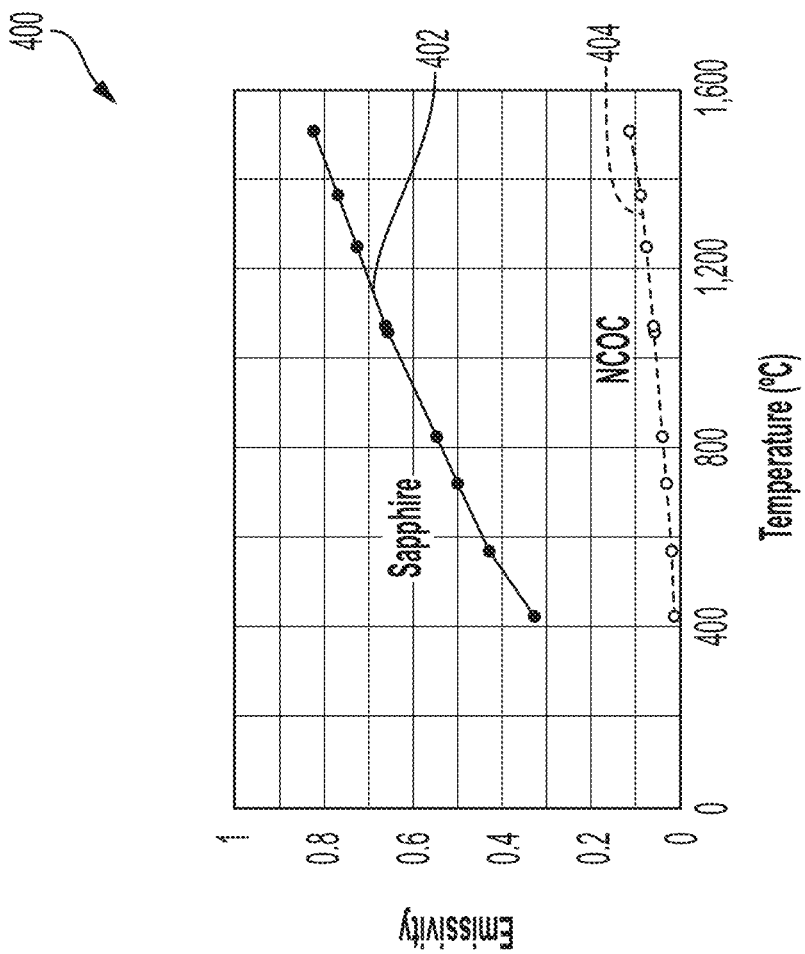
FIG. 4 shows a relation between emissivity and temperature for various materials.

FIG. 4 shows a relation 400 between emissivity and temperature for various materials. Curve 402 shows the relation between emissivity and temperature for Sapphire. Curve 404 shows the relation between for a nano-composite optical ceramic (NCOC). An NCOC includes a multi-crystalline material with grains having nano-scale dimensions. The dimensions of the grains are generally less than $\frac{1}{10}^{th}$ of the wavelength of light, and preferably $\frac{1}{20}^{th}$ of the wavelength. The NCOC displays low emissivity at temperatures up to at least 1600° C. In various embodiments, the first pane 302 is made of NCOC. The second pane 304 can also be made of NCOC. In another embodiment, the second pane 304 can be made of Sapphire.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for guiding a missile, comprising:
   detecting radiation from a target at a target detector of a guidance system of the missile, wherein the radiation passes through a window between the target and the target detector, the window including a first pane and a second pane separated from the first pane by a gap to isolate the second pane from aerodynamic heating; and transporting a pressurized gas through the gap between the first pane and the second pane to control a temperature of the window, wherein the second pane provides an indirect structural support to the first pane via the pressurized gas in the gap.

2. The method of claim 1, wherein the first pane is heated due to aerodynamic heating.

3. The method of claim 2, wherein controlling the temperature of the window further comprises controlling the temperature of the second pane.

4. The method of claim 3, further comprising measuring the temperature at the second pane and adjusting a flow rate and a pressure of the gas in the gap to control the temperature at the second pane.

5. The method of claim 1, further comprising circulating the gas, via a regulator, through the gap from a pressurized tank in the missile.

6. The method of claim 5, further comprising circulating the gas from the pressurized tank to the gap via a housing passage.

7. The method of claim 5, further comprising controlling a pressure of the gas via the regulator.

8. The method of claim 1, wherein the gas is at least one of: (i) nitrogen; and (ii) dry air.

9. A guidance system for a missile, comprising:
a target detector;
a window including a first pane and a second pane separated from the first pane by a gap to isolate the second pane from aerodynamic heating, wherein radiation from a target passes through the window to be received at the target detector; and
a pressurized gas flowing in the gap between the first pane and the second pane, wherein the second pane provides an indirect structural support to the first pane via the pressurized gas.

10. The guidance system of claim 9, wherein the first pane is heated due to aerodynamic heating.

11. The guidance system of claim 10, wherein the gas flowing in the gap controls a temperature of the second pane.

12. The guidance system of claim 11, further comprising a temperature sensor for measuring the temperature of the second pane and a processor for adjusting a flow rate and a pressure of the gas in the gap to control the temperature at the second pane.

13. The guidance system of claim 9, further comprising a pressurized tank that stores the gas and a regulator for circulating the gas from the storage chamber through the gap.

14. The guidance system of claim 13, further comprising a housing including a housing passage for flow of the gas from the pressurized tank to the gap.

15. The guidance system of claim 9, wherein the first pane is made of a nano-composite optical ceramic material and the second pane is made of Sapphire.

16. The guidance system of claim 9, wherein the gas is at least one of: (i) nitrogen; and (ii) dry air.

17. A missile, comprising:
a target detector;
a window including a first pane and a second pane separated from the first pane by a gap to isolate the second pane from aerodynamic heating, wherein radiation from a target passes through the window to be received at the target detector; and
a pressurized gas flowing in the gap between the first pane and the second pane, wherein the second pane provides an indirect structural support to the first pane via the pressurized gas.

18. The missile of claim 17, wherein the gas flowing in the gap controls a temperature of the second pane.

19. The missile of claim 17, further comprising a temperature sensor for measuring a temperature of the second pane and a processor for adjusting a flow rate and a pressure of the gas in the gap to control the temperature at the second pane.

20. The missile of claim 17, further comprising a pressurized tank that stores the gas and a regulating for circulating the gas from the pressurized tank through the gap.

21. The missile of claim 20, further comprising a housing including a housing passage for flow of the gas from the pressurized tank to the gap.

* * * * *